United States Patent

[11] 3,543,805

| [72] | Inventors | Richard A. Matthews<br>Chagrin Falls;<br>James H. Coe, Ravenna, Ohio |
|---|---|---|
| [21] | Appl. No. | 560,328 |
| [22] | Filed | June 24, 1966 |
| [45] | Patented | Dec. 1, 1970 |
| [73] | Assignees | Samuel Moore and Company<br>Mantua, Ohio<br>a corporation of Ohio |

[54] COMPOSITE TUBING
5 Claims, 8 Drawing Figs.

[52] U.S. Cl. ..................................................... 138/141, 138/133
[51] Int. Cl. ..................................................... F16l 9/16
[50] Field of Search ............................................. 138/118, 124, 125, 127, 131—133, 137, 139, 140, 143, 172; 74/102—107 (U.S. Only Cursory), 15(C), 116, 27

[56] References Cited
UNITED STATES PATENTS

| 2,530,105 | 11/1950 | Wallace, Jr. .................. | 138/133X |
| 2,953,627 | 9/1960 | Malneritch et al ............ | 174/102 |
| 3,105,871 | 10/1963 | Eager, Jr. ..................... | 174/105 |
| 1,286,388 | 12/1918 | Mulconroy .................... | 138/131X |
| 2,160,371 | 5/1939 | Schnable ...................... | 138/137UX |
| 2,669,483 | 2/1954 | Fletcher ....................... | 138/118X |
| 2,800,145 | 7/1957 | Peierls et al. ................. | 138/131X |
| 2,899,982 | 8/1959 | Harpfer ........................ | 138/137X |
| 2,932,323 | 4/1960 | Aries ............................ | 138/137 |
| 3,062,241 | 11/1962 | Brumbach .................... | 138/137X |

FOREIGN PATENTS

| 22,114 | 7/1898 | Great Britain ............ | 138/133 |
| 23,630 | 8/1898 | Great Britain ............ | 138/127 |

Primary Examiner—Laverne D. Geiger
Assistant Examiner—Edward J. Earls
Attorneys—Teare, Teare & Sammon ABSTRACT: A composite tubing product for undersea applications and the like which includes an inner core tube made from a thermoplastic material and having an endless inner surface defining a fluid transmission passageway therein. A resilient wire reinforcement element is disposed helically in the passageway and partially embedded in the inner surface to a depth sufficient to prevent axial movement of the element upon flexure of the tubing product. An external fibrous reinforcement means is disposed around the core tube and the polymeric outer jacket is disposed around the reinforcement to provide a protective cover therefor.

INVENTORS
RICHARD A. MATTHEWS
JAMES H. COE
BY

*Jeans, Jeans & Sammon*
ATTORNEYS

Patented Dec. 1, 1970

INVENTORS
RICHARD A. MATTHEWS
JAMES H. COE
BY
Teare, Teare & Sammon
ATTORNEYS

COMPOSITE TUBING

The present case relates to composite tubing and more particularly to reinforced composite tubing.

In certain types of high pressure operation, the conduits for conveying gases or fluids under high pressure are subjected to external pressures which, due to the environment of use, exceed the internal pressures of the fluid conveyed by the conduits or composite tubing. For example, the hose for transporting a helium-oxygen mixture of gases to diving bells and apparatus in deep diving operations and undersea work is subjected to pressures of 400 to 1,000 lbs. per square inch. In the past, rubber hoses have been used for such high external pressure operations. Rubber hoses have the multiple disadvantages of being excessively heavy on a weight per foot basis, of being quite bulky in size and of having a high wall thickness to diameter ratio. Moreover, such hoses can only be manufactured in relatively short lengths requiring additional couplings to obtain long hose lengths; such hoses have caused flaking off of inner liner section when the hose is severely bent which, in turn, causes failure of valves by the flaked-off particles; such hoses absorb the helium mixture under high pressure into the core tube wall. Upon release of the pressure, the core tube wall expands from the absorbed helium thereby causing internal diameter restriction.

An object of the present invention is to produce a reinforced hose suitable for deep diving or direct burial use or for use in application where the external pressure exceeds the internal pressure.

A further object is to produce a composite hose for use where the hose is subjected to high external pressures and wherein the hose is lighter in weight and less bulky in size than prior hoses and wherein the hose can be manufactured in relatively long lengths so as to eliminate undue multiplicity of couplings and wherein the hose has a low wall thickness to inner diameter ratio.

Further objects are to eliminate flaking off of inner liner sections, and to eliminate the absorption of helium gas with the subsequent shrinking of the diameter when the tube is used in deep diving operations.

A still further object is to produce a tubing having strong crush-resistant characteristics.

Referring now to the drawings.

Figure 1:
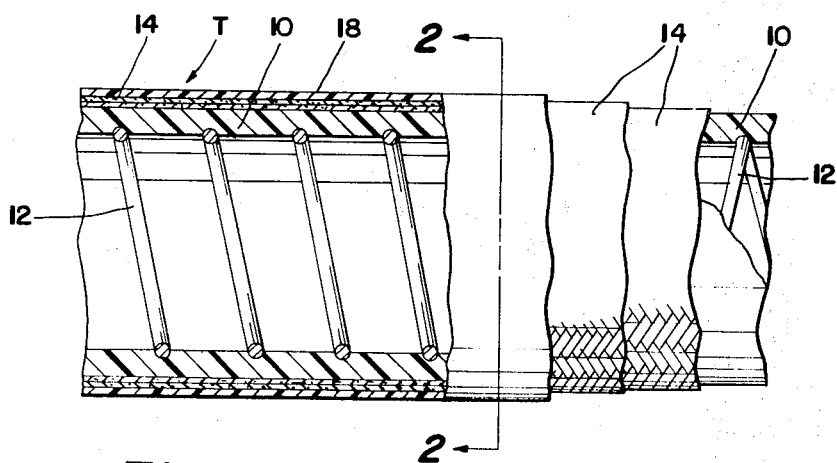
FIG. 1 is a fragmentary partly broken away and partly sectional elevation view of a length of composite tubing in accordance with the present invention.
Figure 2:
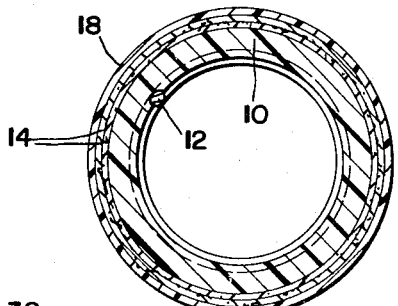
FIG. 2 is a cross-sectional view taken along the line 2—2 of FIG. 1.
Figure 3:
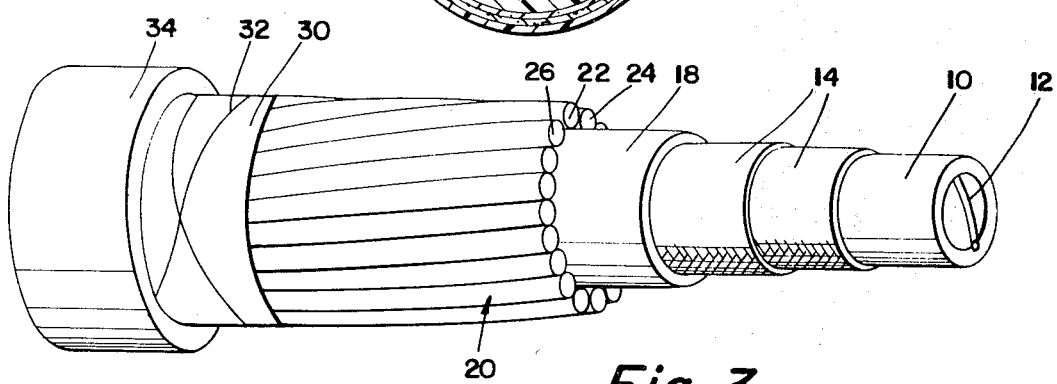
FIG. 3 is a partly broken away elevational view of a length of composite tubing including a cable layer.
Figure 4:
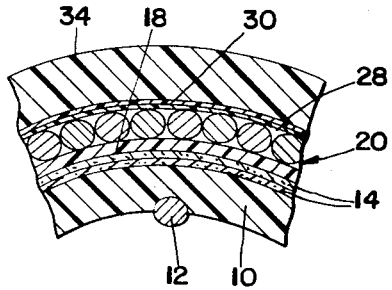
FIG. 4 is a cross-sectional elevation view taken along the line 4—4 of FIG. 3.

Referring again to the drawing, FIG. 1 shows a preferred form of composite tubing T having a hollow inner core 10, helically disposed internal reinforcing means 12 partially embedded in the core, external reinforcing means 14 and a protective outer polymeric sheath 18.

The inner core tube 10 is preferably of crystalline polymeric nonelastomeric material, such as nylon, high or low density polyethylene, polypropylene, or polyacetal.

The helical internal reinforcement means 12 is preferably of metal. Where the tubing is to be used for undersea operations, or in other areas where the tubing may be subjected to the corrosive influence, stainless steel is preferred. It is preferred that the reinforcement means be relatively thick with the turns of the wire being relatively widely spaced. For example, the reinforcement means may be in the form of a relatively thick wire of a thickness such as .072 inch diameter, with the turns of the wire being spaced about four times the thickness. Preferred ranges are for the wire thickness to be between 50 to 80 percent of the wall thickness of the core, and the spacing of the turns between two to five times the thickness of the wires. This depends on the desired degree of embedment.

It is preferred that the reinforcement means be only partially embedded in the core tube and to a distance between 30 percent and 80 percent of the wall thickness of the tube. In a preferred embodiment it is desired to have a sufficient portion of the reinforcing means so that turns adjacent the ends of the core may be removed to expose a helical channel which may coact with a fitting means described in detail in the copending application Ser. No. 560,219, filed Jun. 24, 1966, now U.S. Pat. No. 3,413,020. Within the foregoing ranges, the reinforcing means is embedded sufficiently deep to prevent axial canting or moving of the reinforcing means when the hose is subjected to external pressure, yet is embedded sufficiently shallow that upon the application of the pressure of 5 to 10 lbs. per square inch, such as may be applied by a worker grasping the end of the reinforcement means adjacent the end of a length of tubing, several turns of the wire may be pulled away from the inner face of the end of the tube to form the aforesaid channel.

Where the core tubing is to have external reinforcement layers, such as fibrous reinforcement layers either of a braided or coplanar nature, it is preferred that the outer surface of the core tube 10 be maintained substantially smooth in order to maintain the outer reinforcement in tight juxtaposition about the tubing. If the outer surface of the core tube is substantially rough or undulating due to the insertion of the reinforcement means the resultant product may have a defective external reinforcement. It is understood that some undulations may occur on the outer surface of the core tube. Where undulations occur, "substantially" smooth, as used herein, means that the radial distance from the peaks to the adjacent valleys of an undulation on the outer diameter of the core tube caused by the presence of the reinforcing means does not exceed 8 percent of the axial distance between adjacent turns of the reinforcing means.

In operations where the device is to be subjected to large internal pressures, a fibrous external reinforcement layer 14 may be disposed about the substantially smooth exterior surface of the core tube 10. The external reinforcing layer 14 coacts with the inner reinforcing means to cause the tube core 10 to resist both inward and outward pressures resulting from a fluid, such as gas, passing through the core tube and from the environment such as deep sea pressure from the outer portion of the tube. In addition, because the outer surface of the core tube 10 is smooth, a thinner core tube may be used.

An outer protective layer, such as a thin polymeric jacket 18, may be disposed about the external reinforcing means 14 to protect it from corrosion due to adverse influences, such as sea water and weather.

In addition to providing a passageway for gaseous material, such as helium, the composite tubing may also be utilized to carry wires such as coaxial cable 22, instrument cable 24, and power cable 26 in a cable layer 20 wherein such cables and wires are wrapped about the outer jacket 18 with the interstices being filled by a suitable substance such as jute 28. The cable layer 20 may then be enclosed, such as by Mylar tape 30, held in place by nylon binder 32, the entire tube being enclosed by an outer jacket 34.

Figure 7:
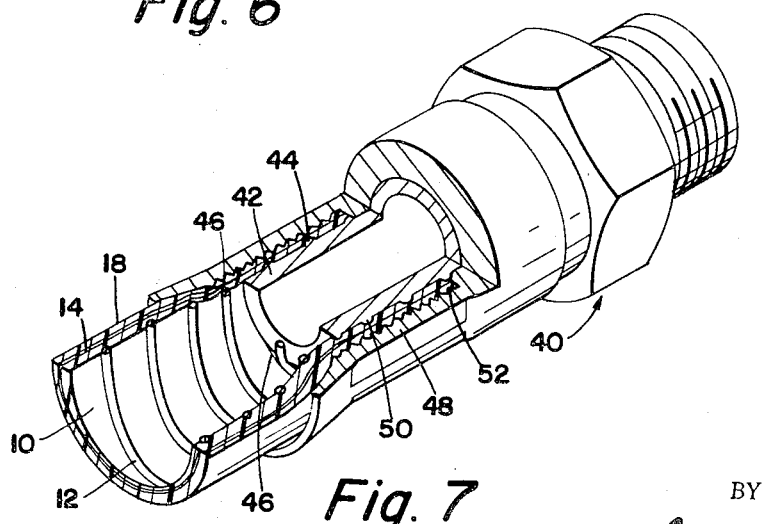
FIG. 7 is a partly sectional perspective view of a section of composite tubing disposed in a fitting.

In operation, the novel tubing, after the end turns of the reinforcing means have been removed as previously described, may be coupled to a fitting as set forth in more detail in the copending application Ser. No. 560,219, filed Jun. 24, 1966, now U.S. Pat. No. 3,413,020 of Johns. Briefly stated and with reference to FIG. 7, this fitting includes an inner sleeve 42 having a continuous spiral thread 44 adapted to engage the spiral cavity 46 created by the removal of the internal reinforcing means 12. The fitting 40 may have an outer sleeve 48 having radially inwardly projecting teeth 50. The outer sleeve 48 projects from a spacing portion 52. The composite tubing is assembled by threading the inner spiral cavity 46 about the threads 44 on the inner sleeve of the fitting and then moving the outer sleeve 48 radially inwardly into engagement with the outer portion of the composite tube such as by convenient crimping action. The coupling arrangement of FIG. 1 for purposes of simplicity, shows a hose without the cable layer 20 and the outer jacket 34.

METHOD

A composite tubing having internal reinforcement means embedded according to the invention may be produced by a novel method which includes the steps of extruding a molten polymeric core tube continuously over a helical wire, partially cooling the core tube assembly, sizing the outer diameter of the tubing in a vacuum operation, and then cooling the product.

Figure 5:
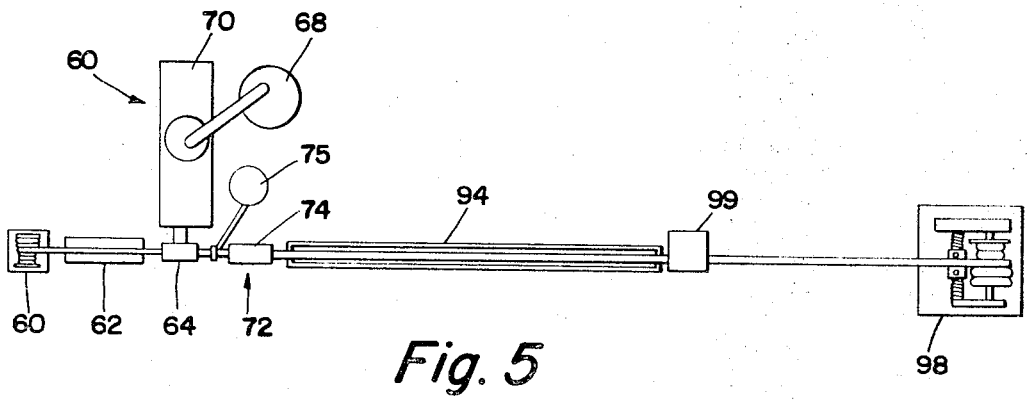
FIG. 5 is a plan view of a system for disposing the helical reinforcement means in the inner core tube.
Figure 6:
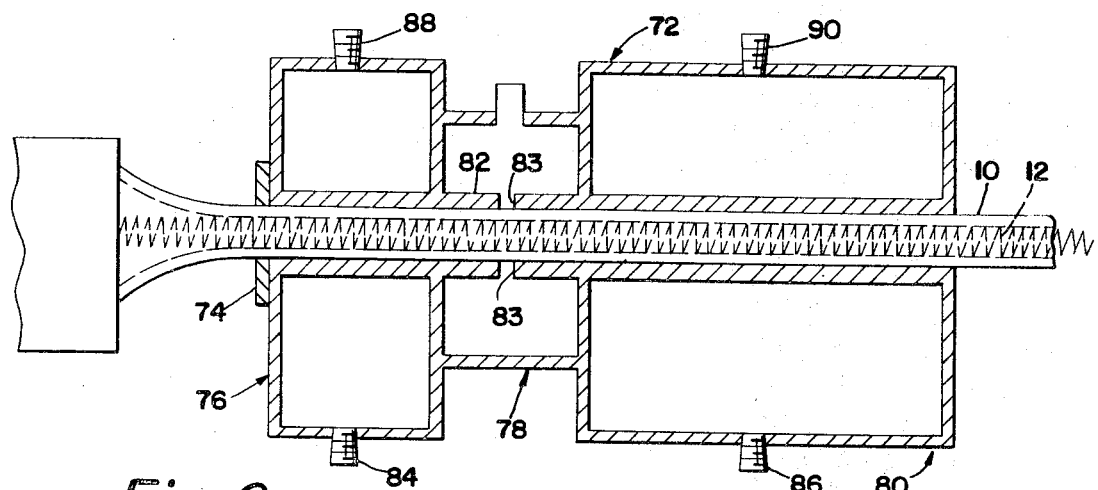
FIG. 6 is a sectional elevation view of the inner core tube and reinforcing means passing from the extruder and through the vacuum forming die.

As shown in FIG. 5 the wire reinforcing means may be continuously withdrawn from a payoff reel 60, passed through a guide trough 62, and drawn through a crosshead 64 of an extrusion apparatus 66. Polymeric material for the core 10 may pass from a hopper 68 through an extruder 70, and into the crosshead 64 from which (FIG. 6) the polymeric material of the core 10 in an expanded form is extruded from the crosshead in circumferentially superimposed spaced relation around the helical reinforcing means 12. The reinforcing means 12 and superimposed core 10 are drawn into a vacuum sizing station 72 wherein the core is forced into surrounding contact with the reinforcing means and to cause partial embedment thereof.

The vacuum station 72 includes a die 74 (FIG. 6) which forces the material of the core 10 between and about the reinforcing means 12 to roughly achieve the desired degree of embedment of the reinforcing means and the desired outer diameter of the core 10. The tubing and partially embedded reinforcing means are then passed through a first cooling chamber 76 where partial cooling of the product occurs, through a vacuum chamber 78 where the exterior surface of the core is smoothed by drawing radially outward the core material which has flowed too far radially inward between adjacent turns, and then through a second cooling chamber 80 where the product is further cooled. By the aforesaid arrangement the excessive undulations between adjacent turns formed by the peaks adjacent the turns and the valleys between the turns are reduced or eliminated. The first cooling step cools the core tube sufficiently that the core material adjacent the outer surface is flowable, but not so flowable as to create surface protrusions between the wire turns. The second cooling step is to maintain the outer surface at the desired degree of smoothness created by the vacuum operation until complete solidification.

A central pipe 82 having an inner diameter equivalent to that of die 74 may extend through the entire vacuum sizing station 72. The pipe 82 is cooled in cooling stations 76 and 80 by water which enters and leaves the stations by inlet ports 84 and 86 and outlet ports 88 and 90, respectively. The pipe 82 has a series of openings 83 annularly disposed about the pipe 82 to permit the vacuum to be applied to the core 10 by a vacuum port 92 connected to a suitable vacuum apparatus 75 (FIG. 5).

The embedded core tube 10 may then be drawn through a conventional cooling trough 94. The windup reel 98 and caterpillar track 99 may draw the reinforcing means 12 and core tube 10 through the aforesaid steps.

The degree of embedment of the internal reinforcing means 12 in the core tube can be controlled by varying the viscosity of the molten plastic as it leaves the extruded die and enters the vacuum sizing unit, or the inside diameter of the vacuum die, or the outer diameter of the coiled wire, or the extruded tube wall thickness. A low viscosity molten plastic will cause the hot melt to flow or be forced about the wire coils to a greater degree than would be the case with a higher viscosity material. Reducing the inside diameter of the vacuum sizing die 74 will also cause a greater embedment of the wire.

Correspondingly, if a coiled wire having a larger outer diameter is selected, with the size of the vacuum die inner diameter remaining constant, greater embedment will occur. Similarly, by extruding the core tube having a thicker wall, greater embedment will result as the heavier wall section will be forced further through the helically disposed reinforcement means. It can be seen that the foregoing four parameters may be varied, as convenient, to achieve the ultimate desired embedment.

A convenient method of procedure is to retain a particular vacuum die inner diameter and internal reinforcing means outer diameter and vary the extruded core wall thickness, and to maintain the desired final core outer dimension by adjusting the degree of vacuum applied, the extrusion speed, and the amount of cooling water applied at the die. It has been found that the tube O.D. will remain constant with the degree of embedment of the reinforcement means depending upon the thickness of the core wall.

The following critical ranges have been determined for controlling the aforesaid parameters:

1. Melt viscosity of the extrudate—between the specific resin melting temperature and up to but not including its degradation temperature.
2. Extruder screw speed range—between 5 and 150 r.p.m., dependent upon the rated capability of the machine, size of tube being produced, and desired extrusion line speed.
3. Haul-off speed—between 2 and 150 feet per minute, dependent upon the machine and equipment capabilities and tube size.
4. Vacuum die inner diameter—between 1 to 1.1 times the final desired core tube outer diameter. The exact size depends upon the resin used, the extrusion speed, the water cooling temperature, and the degree of vacuum applied.

The core tube 10 having the reinforcing means 12 partially embedded therein may then be covered by a suitable external reinforcing means. The reinforcing means may include one or more layers of braiding or one or more coplanar layers of reinforcing materials, such as described in Matthews copending application Ser. No. 693,040.

A suitable jacket, such as polyurethane, polyamide, polyolefin or PVC resin may then be extruded over the reinforcing layer by a suitable method known in the art so as to impart good abrasion resistance and physical protection to the reinforced hose.

Where the hose is to be used for deep sea operations, it may be desirable to wrap a plurality of instrument cables such as at cable layer 20 about the jacket by conventional wrapping means (not shown). The hose may then pass to the next station (not shown) wherein a filler such as jute is applied to fill the interstices and provide an even contour. The tubing may then proceed to another wrapping station (not shown) wherein the cable layer 20 is held in place such as by wrapping by a Mylar tape about the cables. A binder may then be wrapped about the Mylar tape at the next station (not shown). The entire product may be protected by an outer polymeric jacket which is extruded about the product.

An example of the dimensions which may be used in making the product are as follows:
A core tube of three-fourths inch I.D.
A stainless steel wire reinforcement means of 7.50 inch I.D. by .062 inch diameter O.D., having a one-quarter inch lay embedded .030 inch deep into the I.D. of a .080 inch thick nylon core tube wall section.

It is to be understood that where the tubing is to be subjected primarily to high external pressures but relatively low internal pressures, a modified device might be used having only the core tube 10 with the internal reinforcement means 12.

Similarly, where the tubing is not to be used to carry extra cabling such as communications cabling layer 20, the tubing may comprise an inner core tube having the internal reinforcing means embedded therein, a thin external reinforcing layer, and an outer protective jacket.

It is further understood that where desired the reinforcing means 12 may be bonded to the inner core tube by applying a suitable bonding medium to the internal reinforcing means 12 before it is fed to the crosshead of the extruder.

An example of the parameters used in making the aforedescribed three-fourths inch I.D. product having a .030 inch embedment according to the instant invention are as follows:

Extrusion Temperature
    At extruder Barrel (4 progressive heat zones) 505° F., 500° F., 490° F. and 480° F.
    At neck of Extruder    470° F.
    At cross head    470° F.
    At Extruder Die    450° F.
Extruder Screw Speed    30 r.p.m.
Line Speed    9 feet per minute
Melt Temperature    (Temperature of core material as it leaves the extruder) 475° F.
Vacuum sizing Die Inner Diameter    1.006 inches
Extrusion Die Inner Diameter    1.473 inches
Cooling Water Temperature for first and second cooling steps    60° F.
Vacuum Applied    15 inches of Mercury at ambient temperature.

Figure 8:
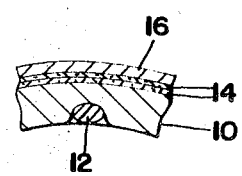
FIG. 8 is a fragmentary sectional view of a modified core and internal reinforcing means assembly.

In a further modification shown in FIG. 8, it may be desirable to embed the tubing so that only a tangential portion is exposed along the inner face.

We claim:

1. A composite tubing product comprising, an inner hollow core tube made from an extruded crystalline, nonelastomeric material which is substantially impervious to the transmission of helium gas, said core tube including internal and external surfaces thereof, said internal surface being substantially continuous between opposed ends thereof defining an axial passageway for the transmission of fluid under pressure; a continuous, resilient metallic wire reinforcement element disposed helically in said passageway and being partially embedded in said internal surface in an amount between 30 percent to 80 percent of the cross-sectional wall thickness of said core tube, a corresponding helical channel formed in the interior surface of said core tube throughout substantially the full length of said core tube by the said embedding of said reinforcement element therein to prevent axial movement of said reinforcement element upon application of external pressure to the tubing product, a portion of said channel being exposed adjacent at least one end of said core tube by the removal of a portion of said reinforcement element adjacent said one end, said helical channel being capable of interiorly receiving a complementary threaded fitting therein, a reinforcing layer disposed in engaged relation around said external surface and extending throughout the length thereof, and a flexible outer jacket disposed around said reinforcing layer and providing a protective cover for said tubing product.

2. A composite tubing product in accordance with claim 1, including an electrical transmission cable layer disposed around said jacket, a polymeric tape layer disposed around said cable layer, and another outer protective jacket disposed around said tape layer to provide a protective cover for said product.

3. A composite tubing product in accordance with claim 2, wherein said cable layer includes a plurality of individual cables, and a filler material disposed in the interstices between said cables.

4. A composite tubing product in accordance with claim 1, wherein said reinforcement element is embedded to between about 50 percent to 80 percent of the cross-sectional wall thickness of said core tube; and wherein the axial spacing between the turns of said reinforcement element is between about 2 to 5 times the diameter of said reinforcement element.

5. A composite tubing product in accordance with claim 1, wherein said core tube is selected from the group consisting of nylon, polyethylene, polypropylene, and polyacetal.